US011203277B1

(12) United States Patent
Yu et al.

(10) Patent No.: US 11,203,277 B1
(45) Date of Patent: Dec. 21, 2021

(54) VENTILATION APPARATUS FOR VEHICLE SEAT

(71) Applicants: Hyundai Motor Company, Seoul (KR); Kia Motors Corporation, Seoul (KR); Hyundai Transys Inc., Seosan-si (KR)

(72) Inventors: Sang-Uk Yu, Seoul (KR); So-Young Yoo, Suwon-si (KR); Hyung-Jin Park, Anyang-si (KR); Byung-Yong Choi, Hwaseong-si (KR); Seon-Chae Na, Yongin-si (KR); Ho-Sub Lim, Seoul (KR); Seon-Kwon Kim, Seongnam-si (KR)

(73) Assignees: Hyundai Motor Company, Seoul (KR); Kia Motors Corporation, Seoul (KR); Hyundai Transys Inc., Seosan-si (KR)

( * ) Notice: Subject to any disclaimer, the term of this patent is extended or adjusted under 35 U.S.C. 154(b) by 0 days.

(21) Appl. No.: 17/108,396

(22) Filed: Dec. 1, 2020

(30) Foreign Application Priority Data

Jun. 17, 2020 (KR) .......................... 10-2020-0073668

(51) Int. Cl.
*B60N 2/56* (2006.01)
*B60N 2/68* (2006.01)

(52) U.S. Cl.
CPC ............. *B60N 2/5657* (2013.01); *B60N 2/68* (2013.01)

(58) Field of Classification Search
CPC .. B60N 2/5635; B60N 2/5657; B60N 2/5621; B60N 2/5642
See application file for complete search history.

(56) References Cited

U.S. PATENT DOCUMENTS

| 5,924,766 | A  | * | 7/1999 | Esaki ................... | B60N 2/5657 297/180.13 |
| 6,644,735 | B2 | * | 11/2003 | Bargheer ............. | B60N 2/5671 297/180.13 |
| 6,786,545 | B2 | * | 9/2004 | Bargheer ................. | B60J 7/223 297/217.1 |
| 7,467,823 | B2 | * | 12/2008 | Hartwich ........... | B60H 1/00285 297/180.14 |
| 7,708,626 | B2 | * | 5/2010 | Bargheer ............. | B60N 2/5685 454/120 |

(Continued)

FOREIGN PATENT DOCUMENTS

| JP | 2002-144846 A | 5/2002 |
| JP | 2004-211966 A | 7/2004 |

(Continued)

*Primary Examiner* — Shin H Kim
(74) *Attorney, Agent, or Firm* — Morgan, Lewis & Bockius LLP (57) ABSTRACT

A ventilation apparatus may include a vehicle seat, wherein the vehicle seat is configured by a seat cushion and a seat back, wherein the seat back is configured by a metal frame, a back board, and a skirt to eject air to the vehicle seat using a cushion duct and a back duct which are varied in length by a connection duct without a change in cross-sectional area of an internal passage through which air passes along the movement of the seat cushion therein, and the back duct and the cushion duct are connected to the skirt by a fixing means while a portion of the back duct and a portion of the cushion duct are covered by the connection duct.

13 Claims, 8 Drawing Sheets

(56) References Cited

U.S. PATENT DOCUMENTS

| | | | |
|---|---|---|---|
| 8,601,824 B2* | 12/2013 | Jun | B60N 2/5657 62/3.4 |
| 9,694,728 B2* | 7/2017 | Ise | B60N 2/5685 |
| 10,160,356 B2* | 12/2018 | Lofy | B60N 2/565 |
| 10,173,561 B2* | 1/2019 | Cho | B60N 2/5628 |
| 10,300,762 B2 | 5/2019 | Vorenkamp et al. | |
| 10,384,575 B2* | 8/2019 | Yu | B60N 2/5642 |
| 11,027,631 B2* | 6/2021 | Hoshi | B60N 2/5621 |
| 2002/0063451 A1* | 5/2002 | Bargheer | B60H 1/00285 297/180.12 |
| 2005/0087325 A1* | 4/2005 | Roland | B60N 2/5628 165/42 |
| 2008/0012398 A1* | 1/2008 | Alacqua | B60N 2/5628 297/180.1 |
| 2008/0122275 A1* | 5/2008 | Flory | B60N 2/5635 297/230.1 |
| 2008/0315634 A1* | 12/2008 | Hartmann | B60N 2/5635 297/180.14 |
| 2009/0031742 A1* | 2/2009 | Seo | B60N 2/5657 62/244 |
| 2010/0300644 A1* | 12/2010 | Chung | B60N 2/5678 165/41 |
| 2017/0080837 A1* | 3/2017 | Cho | B60N 2/5657 |
| 2019/0176663 A1* | 6/2019 | Hoshi | B60N 2/56 |
| 2020/0039397 A1* | 2/2020 | Shiga | B60N 2/5657 |
| 2020/0361350 A1* | 11/2020 | Hoshi | B60N 2/5657 |
| 2021/0101509 A1* | 4/2021 | Hoshi | B60N 2/5635 |

FOREIGN PATENT DOCUMENTS

| | | |
|---|---|---|
| JP | 2007-197872 A | 8/2007 |
| JP | 2018-144519 A | 9/2018 |
| JP | 2019-026096 A | 2/2019 |
| KR | 10-1208756 B1 | 12/2012 |

* cited by examiner

BEFORE BENDING

FIG. 9B

AFTER BENDING

FIG. 10

VENTILATION APPARATUS FOR VEHICLE SEAT

CROSS-REFERENCE TO RELATED APPLICATION

The present application claims priority to Korean Patent Application No. 10-2020-0073668, filed on Jun. 17, 2020, in the Korean Intellectual Property Office, the entire contents of which is incorporated herein for all purposes by this reference.

BACKGROUND OF THE INVENTION

Field of the Invention

The present invention relates to a ventilation apparatus for a vehicle seat. More specifically, the present invention relates to a ventilation apparatus for a vehicle seat configured for maximally utilizing a space inside a seat back by integrating a back duct and a cushion duct which are independently disposed in the related art with a skirt, respectively.

Description of Related Art

In general, since a vehicle seat in use is not provided with a separate ventilation apparatus, during the summer or winter, a vehicle occupant had no choice but to receive hot and cold air delivered from a seat.

Therefore, as a solution to solve the present problem, a method of supplying cold air by mounting a duct in a seat back to induce cold air generated in an air conditioner to the seat back has been used.

However, a conventional seat back frame is formed of a steel structure, and to apply the ventilation specification, a duct for supplying wind to the seat back, and an injection cover for fixing the duct and covering a back rear surface were required.

Figure 1:
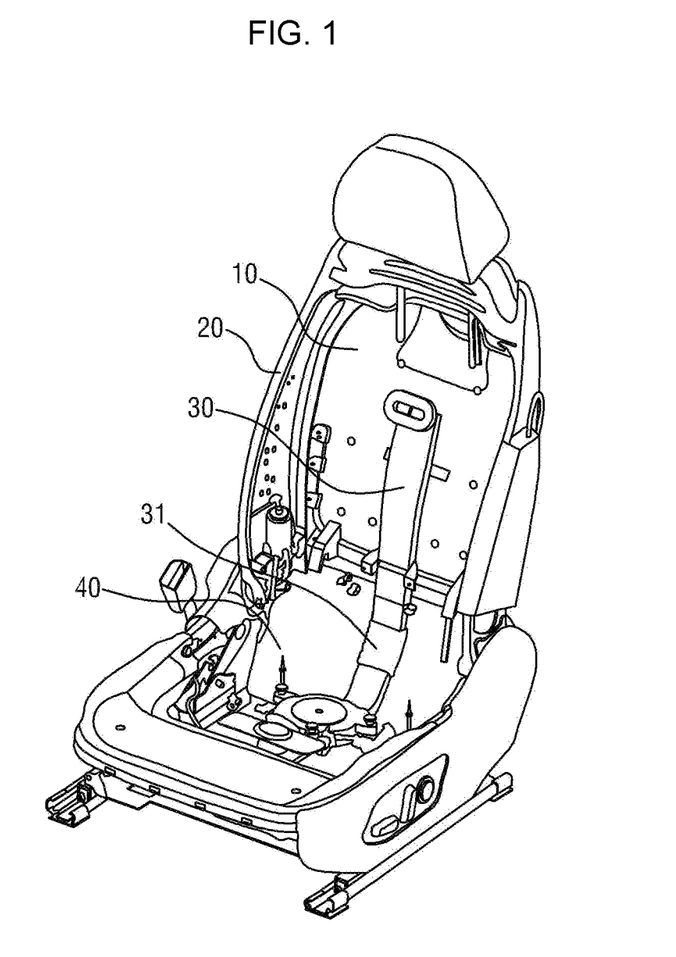
FIG. 1 is a view exemplarily illustrating a state in which a duct is provided in a seat back and a back seat of a conventional vehicle.

That is, referring to FIG. 1, the seat back of a conventional vehicle includes a backboard 10, a frame 20, a back duct 30, a cushion duct 31, and a back skirt 40.

Due to the dual structure of the steel frame and the duct configured as described above, there was a problem in that when the ventilation specification is applied, a duct mounting portion is vulnerable to cause a flow of the duct during vehicle operation, and when seating the passenger, the duct is pressed against the body of the passenger, deteriorating the ventilation performance.

Figure 2:
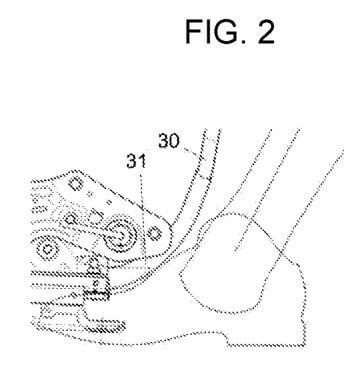
FIG. 2 is a view exemplarily illustrating a state in which the foot of a rear passenger is in contact with a portion through which a conventional duct passes.
Figure 3:
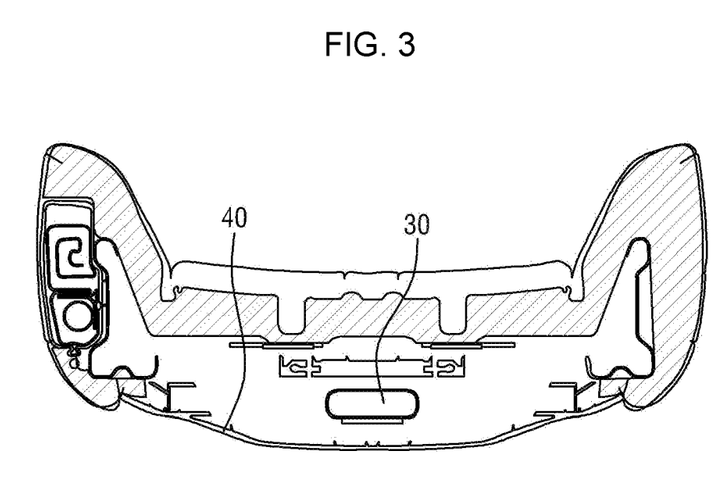
FIG. 3 is a view schematically illustrating a state in which a conventional back duct is provided.

As illustrated in FIG. 1 or 3, the independent back duct 30 and the cushion duct 31 are connected and bellows are configured in the cushion duct to be connected to increase during back reclining and decrease during restoring. However, as illustrated in FIG. 2, there is a problem in that when a foot of a rear passenger is in contact with a portion through which the duct passes, the rear passenger feels a foreign body and a leg room is reduced, or a space in the seat back is narrowed due to the installation of the duct.

Moreover, due to a need of securing a duct mounting space while simplifying the complex structure as described above, the slimness of the seat back is reduced and there is difficulty in increasing the legroom of the rear seat.

Therefore, it is necessary to reduce noise and the like due to flow by securing the ventilation performance and securing the legroom by simplifying and slimming the configuration while applying a ventilation seat.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foreign body problem of a rear passenger's foot by configuring a conventional duct integrally with a back board to maximally utilize a space inside a seat back and maintaining a duct shape using a soft material for a connection portion of a cushion and a back duct.

Various aspects of the present invention are directed to providing a ventilation apparatus configured for a vehicle seat, wherein the vehicle seat is configured by a seat cushion and a seat back, wherein the seat back is configured by a metal frame, a back board, and a skirt to eject air to the vehicle seat using a cushion duct and a back duct which are varied in length by a connection duct without a change in cross-sectional area of an internal passage through which air passes along the movement of the seat cushion therein.

The back duct is formed integrally on the seat back board or provided to be sealed by a fixing means, and the connection duct is coupled to the skirt by the fixing means while the cushion duct and the back duct are coupled to each other.

The present invention having the above configuration can obtain the following effects.

First, it is possible to maximally utilize a space inside the seat back by configuring a conventional back duct integrally with the back board.

Second, it is possible to enhance the productability of the seat by improving an occupancy (legroom) of the passenger and an appearance.

Third, it is possible to improve the performance by maximizing the cross-sectional area of the duct by securing the space in the seat.

Fourth, it is possible to prevent interference with the passenger's foot located in the rear seat while maintaining the duct shape, by use of a soft material for the connection duct.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described in detail with reference to the accompanying drawings to be easily implemented by those skilled in the art to which various exemplary embodiments of the present invention belongs. However, the present invention may be realized in various different forms, and is not limited to the exemplary embodiments described herein.

Parts irrelevant to the description will be omitted to clearly describe the present invention, and like or similar elements will be designated by like reference numerals throughout the specification.

Terms and words used in the exemplary embodiment and claims may not be interpreted as being limited to typical or dictionary meanings, but may be interpreted to the inventors as meanings and concepts which comply with the technical spirit of the present invention, based on the principle that the inventors can appropriately define the concept of the term to describe their own invention in the best manner.

Hereinafter, exemplary embodiments of the present invention will be described in detail with reference to the accompanying drawings.

Figure 4:
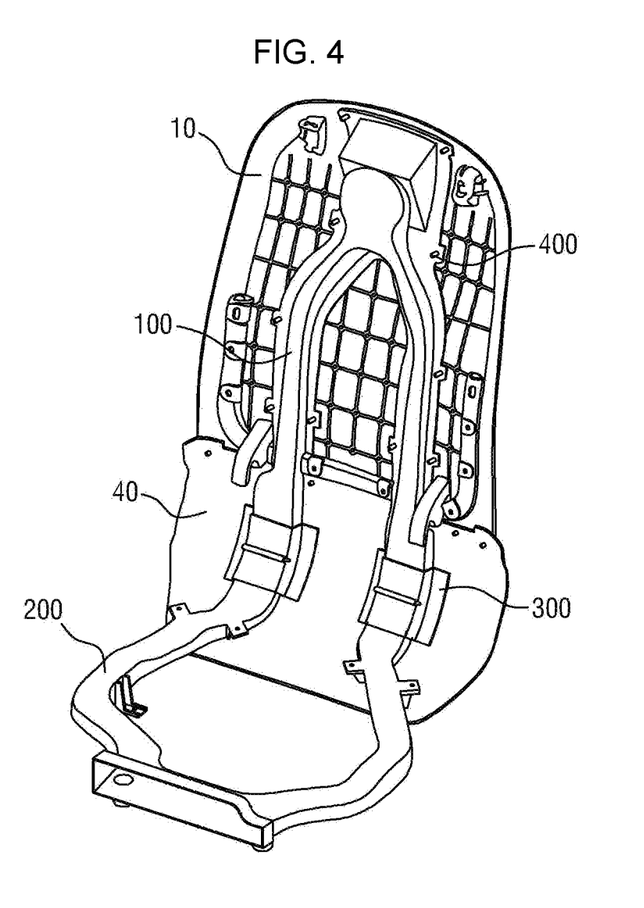
FIG. 4 is a perspective view schematically illustrating a state in which a ventilation apparatus of a vehicle seat according to various exemplary embodiments of the present invention is provided.
Figure 5:
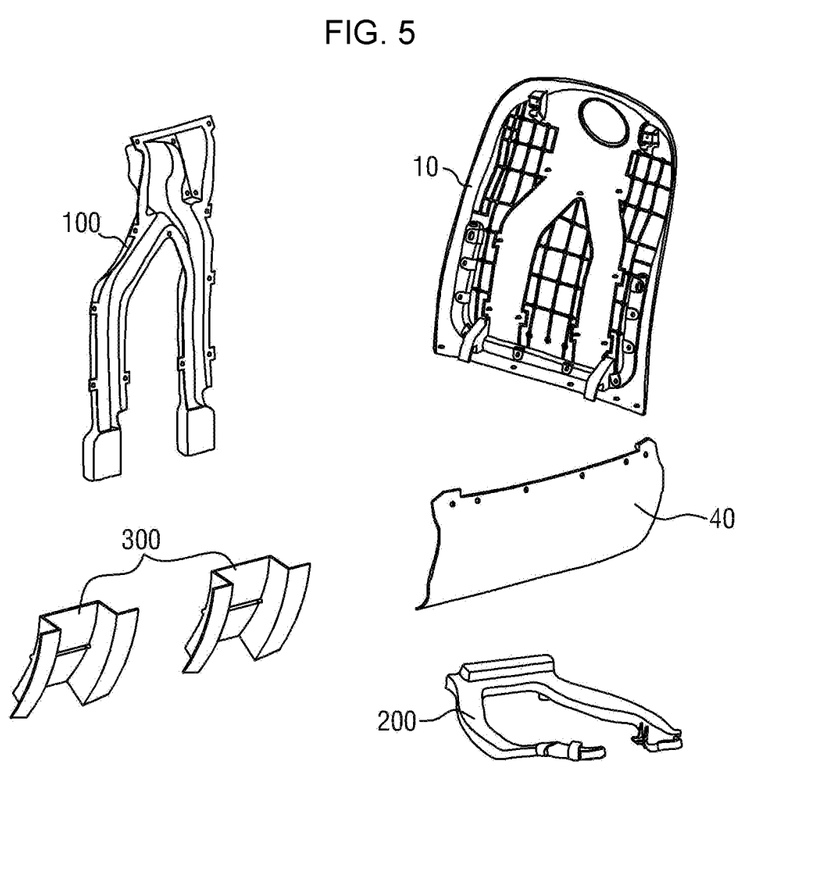
FIG. 5 is a view for describing components of the ventilation apparatus of the vehicle seat according to various exemplary embodiments of the present invention.
Figure 6:
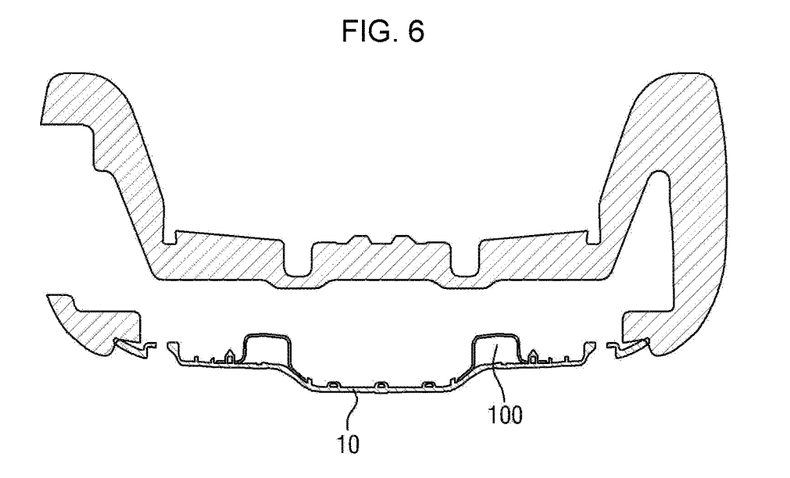
FIG. 6 is a cross-sectional view exemplarily illustrating a state in which a back duct is provided on a back board forming the ventilation apparatus of the vehicle seat according to various exemplary embodiments of the present invention.

The present invention includes a back board 10, a skirt 40, a back duct 100, a cushion duct 200, and a connection duct 300, as illustrated in FIG. 4 and FIG. 5.

The back duct 100 is formed of an inverted Y-shape, wherein a front side thereof is opened, and a flange is formed at the edge portion to be fixed to the back board 10 by the fixing means 400.

Of course, the back duct 100 may be injection-molded as a separate material, but may be integrally molded with the back board 10.

The fixing means 400 may be a screw, a bolt and a nut, or a rivet.

Furthermore, the cross-section of the opening-type back duct 100 is formed in a substantially "Π" shape, and a portion in contact with the cushion duct 200 has a rectangular closed cross-section.

At the present time, the interior of the duct may also be coated for a smooth air flow.

Figure 7:
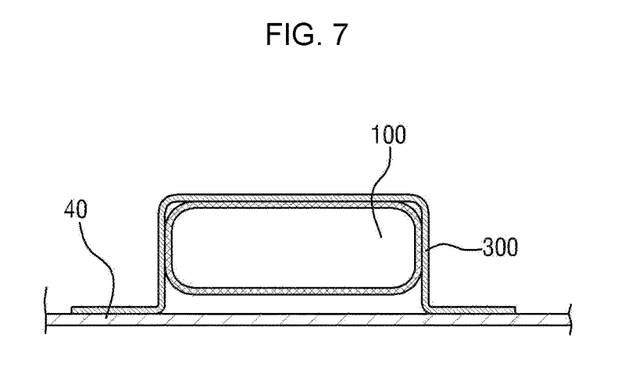
FIG. 7 is a cross-sectional view exemplarily illustrating a state in which a connection duct is provided on a skirt forming the ventilation apparatus of the vehicle seat according to various exemplary embodiments of the present invention.
Figure 8:
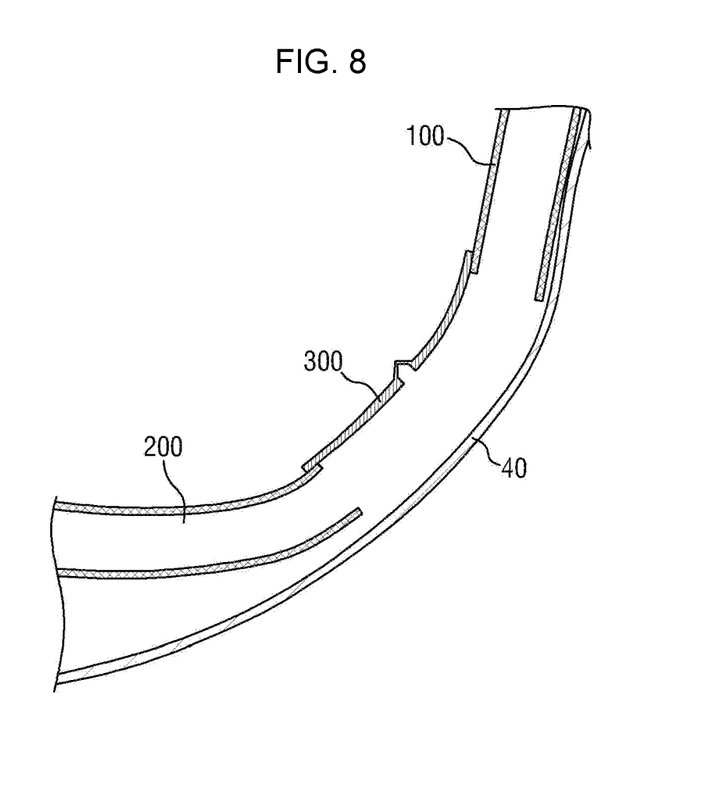
FIG. 8 is a view schematically illustrating a state in which a cushion duct and a back duct forming the ventilation apparatus of the vehicle seat according to various exemplary embodiments of the present invention are fixed to a skirt by a connection duct.
Figure 9A:
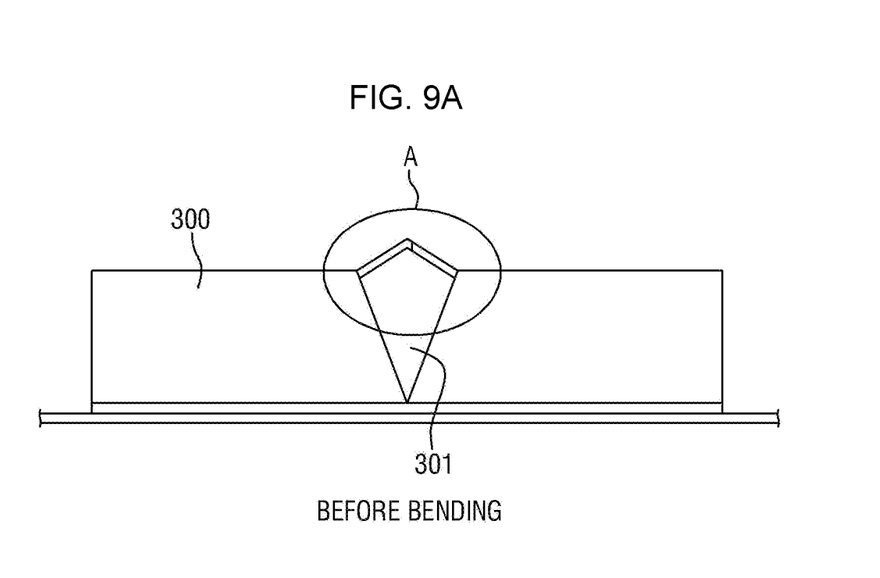
FIG. 9A and FIG. 9B are views illustrating an operating state of the connection duct forming the ventilation apparatus of the vehicle seat according to various exemplary embodiments of the present invention.
Figure 9B:
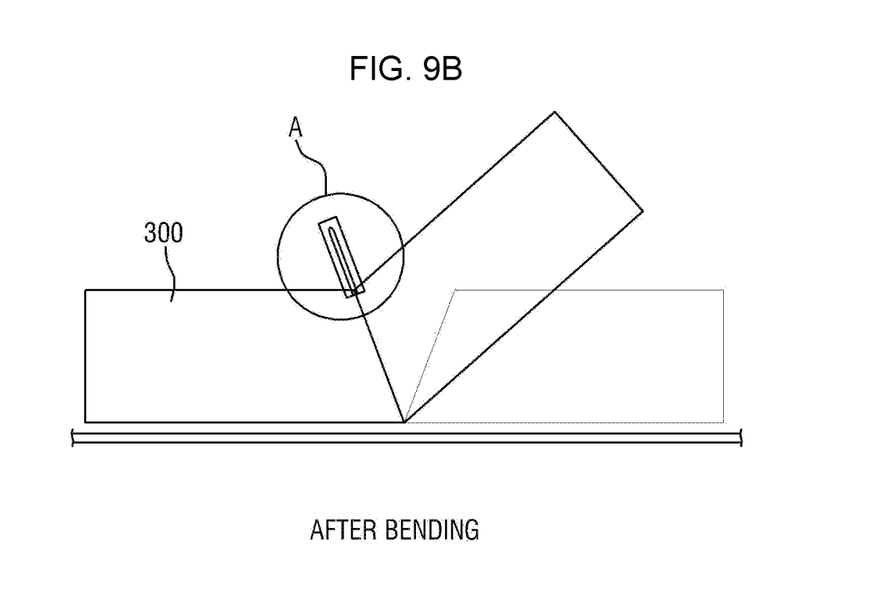

As illustrated in FIG. 7 or 9, the connection duct 300 has a shape similar to the cross-section of the back duct 100, and a substantially V groove 301 is formed in the center.

The V groove 301 is considered when the seat back formed of the backboard 10 is folded, and the material may be sewn or molded using a soft member.

At the present time, as illustrated in FIG. 9, the connection duct 300 is configured to protrude like a portion A to the external surface of the back duct 100, so that the cross-sectional area inside the connection duct 300 is not reduced in a bending state.

The soft member may be a non-woven fabric made of a thick material.

On the other hand, the skirt 40 is made of a thick non-woven fabric so that the connection duct 300 is fixed by a thermal fusion means.

Figure 10:
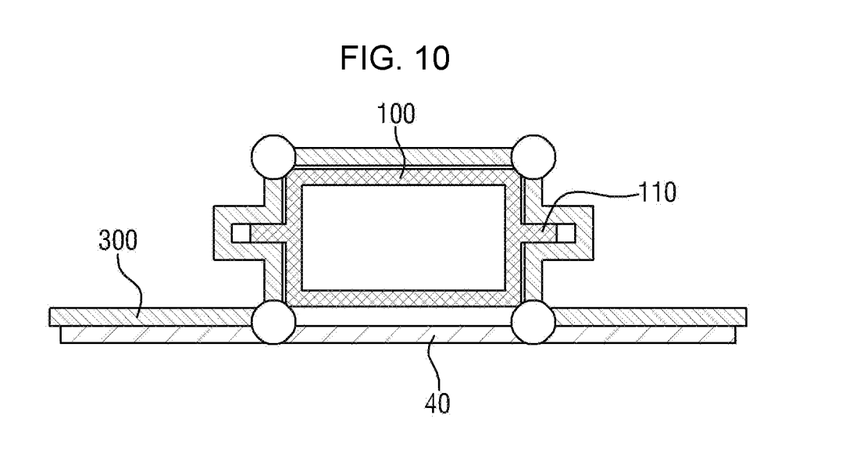
FIG. 10 is a view exemplarily illustrating another method for coupling the connection duct and the back duct forming the ventilation apparatus of the vehicle seat according to various exemplary embodiments of the present invention.

As illustrated in FIG. 10, in a manner of fixing the connection duct 300 and the back duct 100, a flange 110 is formed on the back duct 100, and the connection duct 300 may be molded and used to fit the flange 110.

Therefore, the ventilation apparatus of the vehicle seat configured as described above is configured so that the back duct 100 is integrally configured on the back board 10, maximally utilizing the space inside the seat back, and the passenger's foot is in contact with the back duct, improving productability of the seat by improving the overall appearance while solving the inconvenience.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A ventilation apparatus for a vehicle seat configured by a seat cushion and a seat back configured by a metal frame, a back board, and a skirt, the ventilation apparatus comprising:
   a cushion duct, a back duct and a connection duct,
   wherein air is ejected to the vehicle seat using the cushion duct and the back duct which are varied in length by the connection duct without a change in cross-sectional area of an internal passage through which the air passes along a movement of the seat cushion therein, and
   wherein the back duct and the cushion duct are connected to the skirt by a fixing means while a portion of the back duct and a portion of the cushion duct are covered by the connection duct.

2. The ventilation apparatus for the vehicle seat of claim 1, wherein the back duct is provided on the back board to be sealed by the fixing means.

3. The ventilation apparatus for the vehicle seat of claim 1, wherein one end portion of the back duct is branched to form a first end portion and a second end portion.

4. The ventilation apparatus for the vehicle seat of claim 3, wherein the first end portion and the second end portion of the back duct are connected to the cushion duct.

5. The ventilation apparatus for the vehicle seat of claim 1, wherein the back duct is formed in a Y-shaped duct.

6. The ventilation apparatus for the vehicle seat of claim 1, wherein the back duct is formed of a rectangular closed cross-section at an inlet side connected to the cushion duct, and a side fixed to the back board is formed of a "Π"-shaped cross section with one opened side.

7. The ventilation apparatus for the vehicle seat of claim 1, wherein the connection duct is formed by sewing a non-woven fabric or formed of a molded product.

8. The ventilation apparatus for the vehicle seat of claim 1, wherein the connection duct is to fix a soft member by thermal fusion or fitting to flow in an operating direction of a recliner.

9. The ventilation apparatus for the vehicle seat of claim 1, wherein the connection duct has a V-shaped groove formed in a middle portion of the connection duct.

10. The ventilation apparatus for the vehicle seat of claim 1, wherein the connection duct is configured to protrude from an external surface thereof.

11. The ventilation apparatus for the vehicle seat of claim 1, wherein a first side of the connection duct is fixed to the back duct or the cushion duct, and a second side thereof is slidingly coupled to the unfixed back duct or cushion duct.

12. The ventilation apparatus for the vehicle seat of claim 1, wherein an end portion of the back duct includes a flange at an edge portion thereof to be fixed to the back board.

13. The ventilation apparatus for the vehicle seat of claim 12, wherein the flange of the back duct is fixed to an inner surface of the back board.

* * * * *